United States Patent [19]
Dybro et al.

[11] Patent Number: 5,839,686
[45] Date of Patent: Nov. 24, 1998

[54] CHAIN DRIVEN PRETENSIONER AND RETRACTOR

[75] Inventors: Niels Dybro, Utica; Jason Raines, Harrison Township., both of Mich.; Harjeet Gill, Windsor, Canada; Harold John Miller, III, Troy, Mich.

[73] Assignee: AlliedSignal Inc., Morristown, N.J.

[21] Appl. No.: 542,370

[22] Filed: Oct. 12, 1995

[51] Int. Cl.⁶ .............................. A62B 35/00; B65H 75/48
[52] U.S. Cl. .......................................................... 242/374
[58] Field of Search .............................. 242/374; 280/806, 280/807

[56] References Cited

U.S. PATENT DOCUMENTS

| | | | |
|---|---|---|---|
| 4,014,479 | 3/1977 | Nilsson et al. | 242/374 |
| 4,381,084 | 4/1983 | Fohl | 242/374 |
| 4,434,953 | 3/1984 | Gemar et al. | 242/374 |
| 4,444,010 | 4/1984 | Bendler | 242/374 |
| 5,505,399 | 4/1996 | Schmid et al. | 242/374 |

FOREIGN PATENT DOCUMENTS

| | | | |
|---|---|---|---|
| 2 430 241 | 2/1980 | France | 242/374 |
| 25 05 625 | 8/1976 | Germany | 242/374 |
| 25 05 626 | 8/1976 | Germany | 242/374 |
| 32 20 498 A1 | 12/1983 | Germany | 242/374 |
| 2 223 666 | 4/1990 | United Kingdom | 280/806 |

*Primary Examiner*—John P. Darling
*Attorney, Agent, or Firm*—Markell Seitzman

[57] ABSTRACT

An apparatus (20, 400) comprising: first driven gear (402) operatively linked a spool of a retractor (20) to rotate the spool (24) in a direction of retraction to cause a seat belt (31) wound thereabout to retract; flexible first driving member (430, 432) having a front end (435) initially maintained out of engagement with the driven gear and pushed into engagement with the first driving member to cause same to rotate; second driving member (420) operatively linked to a rear end of the first driving member for pushing the first driving member into engagement with the driven gear thereby causing the driven gear to rotate.

12 Claims, 3 Drawing Sheets

CHAIN DRIVEN PRETENSIONER AND RETRACTOR

BACKGROUND AND SUMMARY OF THE INVENTION

The present invention generally relates to a safety restraint device for protecting vehicle occupants and more particularly a pretensioning device typically used to tension a seat belt wound about a seat belt retractor or attached to that portion of the seat belt connected to a buckle.

Pretensioners or belt tighteners, as they are also called, are currently used in industry to operate in conjunction with seat belt retractors or are attached to one end of the belt that is connected to a seat belt buckle. A typical pretensioner for a seat belt retractor or buckle comprises a movable piston joined to a cable. The piston typically moves down a straight tube. The use of the straight tube creates packaging problems within the vehicle as it is difficult to orient the tube within the room that is made available. Retractor pretensioners also use clutches to decouple the pretensioner from the retractor so that the pretensioner does not interfere with the normal operation of the retractor. These clutches are bulky and further increase the package size of the restraint device. The clutches are often intricate devices which complicate the operation of the pretensioner and add to its cost.

It is an object of the present invention to provide a simple, compact and reliable pretensioner that can be used with a seat belt retractor or a seat belt buckle.

In the preferred embodiment the present invention comprises a first driven means operatively linked to a spool of a retractor to selectively rotate the spool in a direction of retraction to cause a seat belt wound thereabout to retract; a flexible first drive means having a front end initially maintained out of engagement with the first driven means and pushed into engagement with the first driven means to cause the first driven means to rotate; a second drive means operatively linked to a rear end of the first drive means for pushing the second drive means into engagement with the first driven means thereby causing the first drive means to rotate. In the preferred embodiment of the invention the first driven means comprises a toothed gear, the flexible drive means comprises a length of chain such as bicycle chain or plastic toothed chain or track and the second driven means comprises a pyrotechnic element such as a detonator, initiator or squib which generates products of combustion within a pressure chamber against a piston linked to the flexible drive means. The toothed gear is connected to the retractor spool to reverse rotate the spool during an emergency as it is moved by the flexible drive means. The retractor includes various sensors to initiate the locking up of the retractor during an accident to prevent protraction of the seat belt. The preferred embodiment of the invention discloses a constant force retractor, that is, one that creates a controlled, limited force of the seat belt during emergency operation, however, virtually any retractor will operate with the pretensioner.

Many other objects and purposes of the invention will be clear from the following detailed description of the drawings.

DETAILED DESCRIPTION OF THE DRAWINGS

Figure 1:
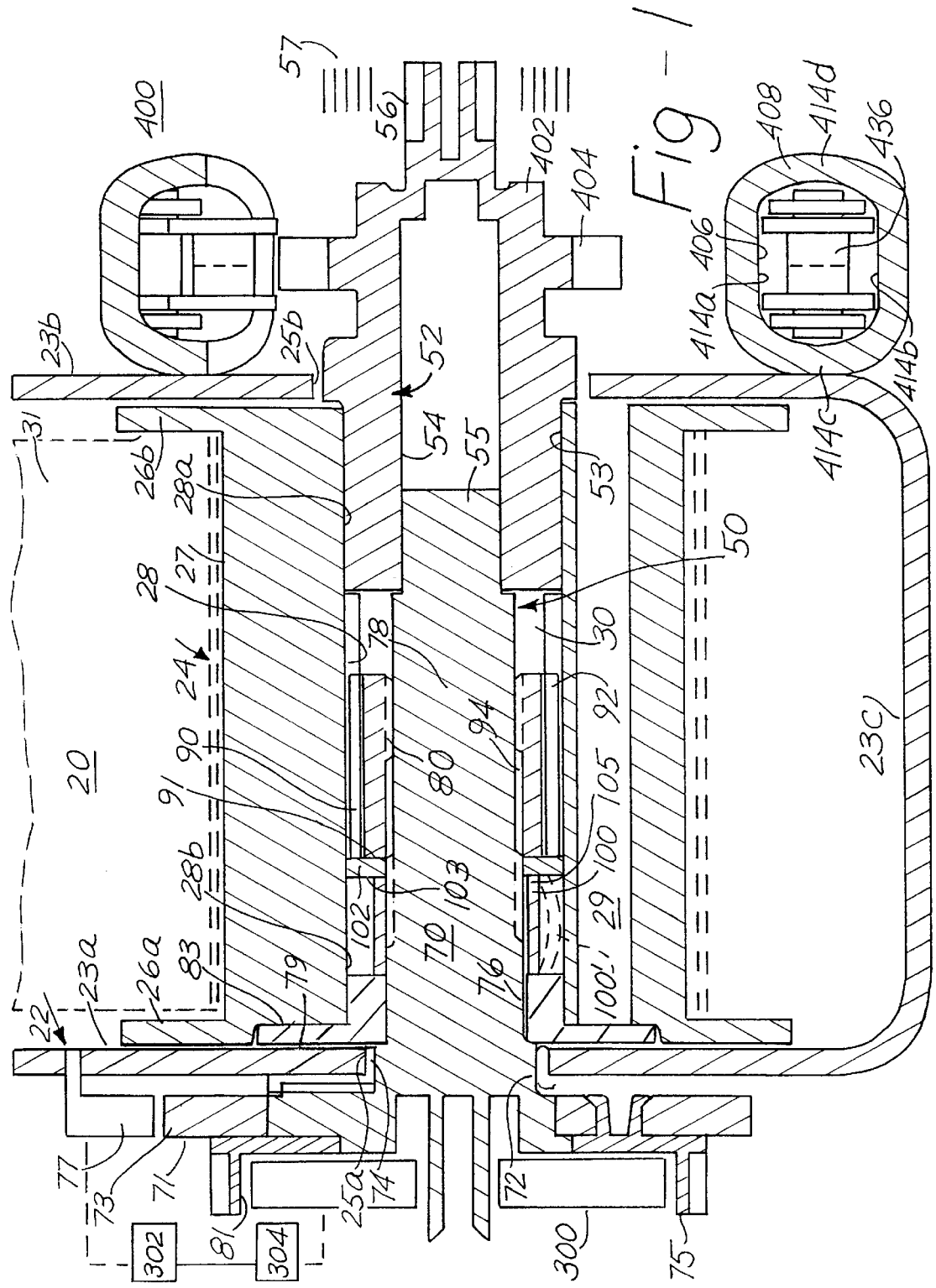
FIG. 1 illustrates a cross-sectional view illustrating the major components of the present invention.

Reference is made to FIG. 1 which illustrates a constant force retractor 20 operating in concert with a pretensioner 400. In the preferred embodiment of the invention the retractor is an energy absorbing retractor capable of generating a fairly constant reaction force on the webbing after the pretensioner has been activated. It should be appreciated that the pretensioner can operate with any retractor. The retractor 20 comprises a U-shaped frame 22 adapted to be connected to a part of a vehicle body or to a part of an occupant seat.

The frame includes frame sides 23a,b having respective openings 25a and 25b and a rear or connecting part 23c typically having an opening for receipt of a fastening bolt. The central openings may be of different diameter as shown or the same which will depend upon how the spool is supported on the frame sides. The retractor additionally includes a spool or reel 24 rotatably mounted to the frame 22. The spool includes two (2) flanges 26a and 26b, a center part 27 about which seat belt webbing 31 is wound (two layers of webbing are shown in dotted line) and a center bore 28 which includes a plurality of axially directed splines, slots or key ways 30. The center part 27 includes a slot 29 which provides a means for inserting one end of the seat belt 31 into the spool in a known manner.

Partially situated within the bore 28, is an axle assembly 50 which includes a first member 52 inserted in bore end 28a, and a second member 70. The first member 52 includes a walled portion 53 and provides a bushing surface to rotatably support the spool. The first member 52 also includes a hexagonal bore 54 to provide a driving, rotational engagement with a complementary shaped end 55 of the second member 70 of the axle assembly. The first member 52 includes a forked end 56 that forms a spring arbor and is adapted to receive a rewind spring 57, of known construction to retract the extended seat belt. Integrally formed on the first member 52 is a gear, 402 which is part of the pretensioner 400.

The second member 70 includes a first part 72 that is supported relative to the frame 22 by a bearing 74. The second member 70 additionally includes a second part 76 fitted against an annular member 79 which serves as a mechanical stop. The member 79 is received within an annular groove 81 of the spool and also provides a bearing surface about which the spool rotates. The second member 70 includes a narrow portion 78 that extends further into the center of the bore 28. This narrow portion 78 includes a plurality of threads 80 and terminates in the hexagonally shaped end 55 which is driven by the first member 52. A carrier member such as a threaded nut 90 interposes the narrow member 78 and the spool 24. As can also be seen from FIG. 1 the inside surface of the nut includes threads 94 which matingly engage threads 80 of the narrow portion 78. This nut, on its outer surface, includes a plurality of splines 92 which permit the nut to move axially along the cooperating splines 30 of the spool 24 as it rotates on the threads 80. As can be appreciated the threads can be on the spool and the splines on the narrow portion 78. The second member 70 also includes a lock wheel 71 that may be integrally formed or separate having lock teeth 73 thereon engaged by a locking pawl 77 rotatably mounted to the frame 22 in a known manner. Situated between the nut 90 and the stop member 79 is a deformable, energy absorbing bushing 100 and a thrust washer 102. There is a clearance fit between the washer 102 and the spool bore 28 and a slidable engagement with the outer diameter of the second member 70. The purpose of the thrust washer is to eliminate any torsional loading between the nut and the bushing 100 and permit the nut to be free to rotate relative to the washer 102. The primary reason for eliminating or at least minimizing the torsional loading between the nut and the washer 102 is to better control the mode of deformation of the crushable member or bushing 100. The torsional loading can be effectively eliminated by providing a slick, low friction interface at or a coating to the end face 91 or the entire surface of the nut 90. Such interface or coating might include coating the nut with a fluorocarbon material or chrome plating the nut. Another low friction interface might be achieved by a nitride coating on the nut or fabricating the nut using an oil impregnated, sintered metal.

In addition, experience has shown that the surface condition of the washer 102 can affect the mode of deformation of the bushing 100 and thereby the reaction torque (or force) generated by the retractor 20. Testing has shown that if this surface is ground smooth the reaction force generated, at the interface of the washer and the bushing, tends to cause the end 105 of the bushing to flare outwardly. With the end of the bushing flared outwardly it has been found that the reaction force generated on the seat belt by the retractor is not limited but tends to increase with further compression of the bushing 100. If the surface 103 is rough, the bushing buckles and assumes a preferred barrel-like shape permitting achievement of the above mentioned limited reaction force characteristic. In tests of the present invention a roll formed bushing has been used or one that was lightly sand blasted. A surface roughness of greater than 32 microns should provide the proper amount of roughness to insure the desired bushing deformation characteristic. To enhance the attainment of this barrel-like shape during the compression of the bushing it may be desirable to use a bushing that is initially barrel shaped, that is, its diameter is larger near its middle than at its ends. One such barrel-like bushing is shown in phantom line 100'. The bushing 100' can be a pre-form shaped by hydro-form or roll forming processes.

The retractor additionally includes a web sensor 300 and a vehicle sensor 302. Member 70, that is the lock wheel 71, is locked in response to information derived from the vehicle sensor and a web sensor. These sensors respectively sense excessive vehicle deceleration and an excessive rate increase of seat belt protraction from the retractor 20. One such vehicle sensor 302 and web sensor 300 are diagrammatically shown in FIG. 1. In reality the web sensor may be nestled within a lock cup 304 which is received adjacent a ratchet wheel 75. The vehicle sensor is carried by the lock cup and includes a sensor pawl that engages ratchet teeth 83. Movement of the lock cup moves the lock pawl 77 into engagement with the lock teeth 73. European Patent Document EP 0 228 729 A1 is illustrative of a retractor having a web sensor, vehicle sensor, and lock cup to move the lock pawl 77 into engagement with the a lock wheel. This document is incorporated herein by reference.

Figure 2:
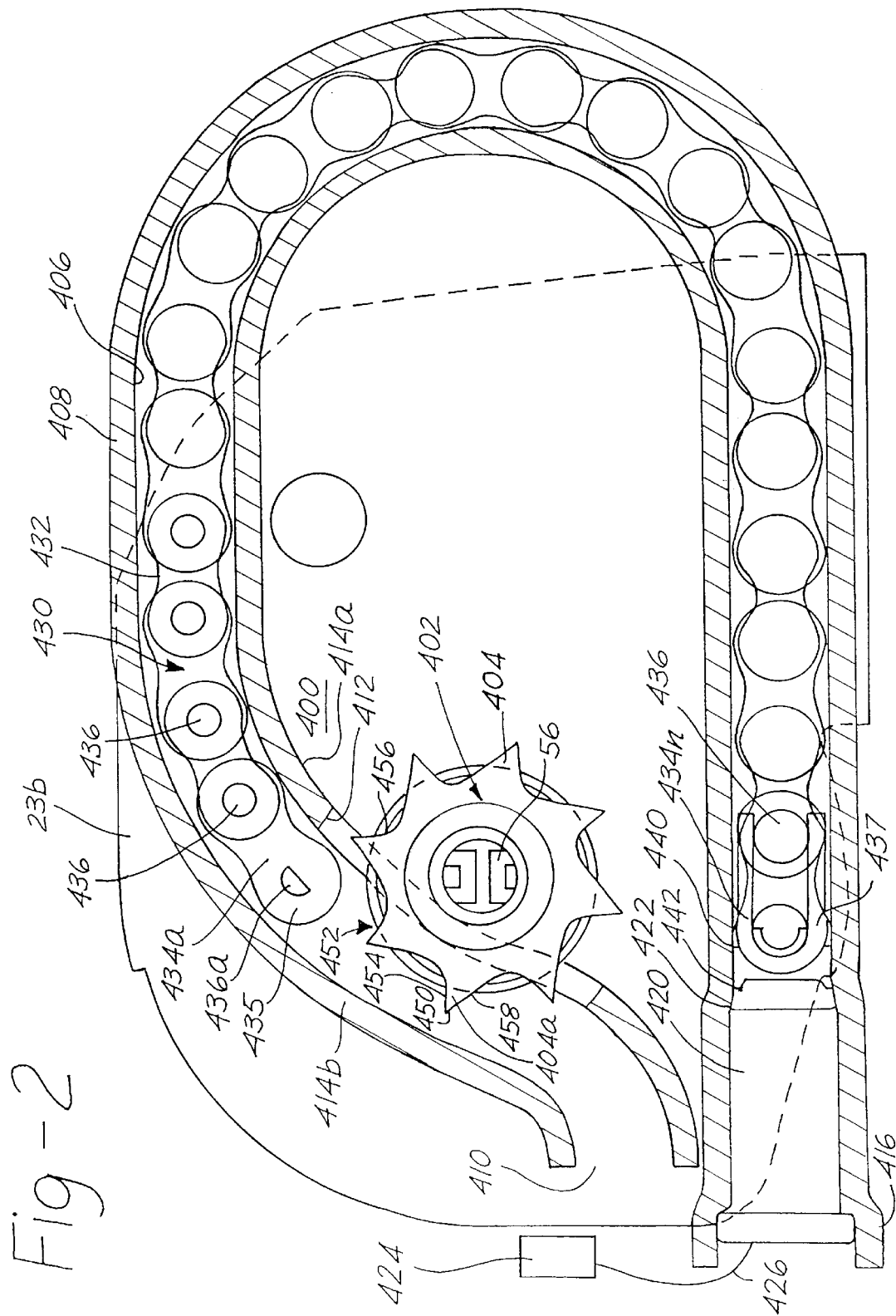
FIG. 2 is a cross-sectional view through section lines 2—2 of FIG. 1.

The pretensioner 400 includes a driven gear 402 having teeth 404 and rotatable with the spool 24 and an arcuately shaped passage 406 formed within a tubular housing 408. As can be seen from FIG. 1 the cross-section of the passage is generally oval shaped having two opposing straight guide walls 414*a* and b and opposing, curved guide walls 414*c* and *d*. The housing 408 is attached to the frame 22, as also be seen from FIG. 1. The tube 408 includes a first open end 410 and an opening 412 in a guide wall 414*a* thereof. As can be seen from FIG. 2 the teeth 404 of gear 402 extend into the opening 412 and into the passage 406. The rear end 416 of the tube is flared to permit a detonator, squib, or initiator 420 to be secured therein. The detonator, initiator or squib 420 is known in the art and produces products of combustion within a combustion chamber 422 upon receipt of an electric control signal generated by an electronic control unit 424 and communicated to the squib via wires 426. The control or activation signal is generated upon sensing that the vehicle is involved in an accident of sufficient magnitude to warrant added occupant protection. Situated within the tube 408 is a driving mechanism generally shown as 430. In the illustrated embodiment this driving mechanism constitutes a flexible, toothed or linked member including bicycle chain 432 having a plurality of links 434*a*–434*n*. Each of the links includes a cross-bar 436 as illustrated in FIGS. 1 and 2. As can be seen from FIG. 2 the end 435 of the chain 432 is initially maintained apart from the drive gear 402 such as not to impede the normal retraction and protraction of the spool. The other end 437 of the chain is attached to a piston 440 which forms one side of the chamber 422 and squib 420. The piston 440 includes a flexible, flared annular end 442 comprising a gas seal.

As can be seen from FIG. 1 each the teeth 404 includes a pointed tip 450. Extending down from the tip is an engagement surface generally shown as 452. The engagement surface includes a flat portion 454 and a curved portion 456. The radius of curvature of the curved portion is preferably equal to the radius of each chain cross-bar 436. The rear surface 458 of each tooth 404 is also generally flat. With the exception of the first chain cross-bar 436*a* each cross-bar is cylindrically shaped to engage with the engagement surface of a corresponding tooth. The first cross-bar 436*a* is a half-cylinder with a flat bottom. The purpose of this shape is to provide for the synchronous engagement of the cross-bars 436 with the teeth 404 and also to prevent a cross-bar to tooth tip jammed condition. Without the half-cylinder profile of the first tooth and depending upon the orientation of the gear 402, a circular, cylindrical first cross-bar might engage the tip of a tooth and jam. By providing the first cross-bar with the above profile the first cross-bar will pass over a tooth that is in an angular position that would otherwise induce jamming and engage the next tooth, for example tooth 404*a*. The engagement of the first cross-bar with a tooth now insures the proper synchronous engagement of the other cross-bars and teeth.

The operation of the system of the retractor 20 and pretensioner 400 is as follows. Upon sensing an emergency condition the detonator 420 is activated to produce products of combustion which bear against a facing wall of the piston 440. The seal 442 of the piston prevents the products of combustion from escaping from the chamber 422. Thereafter the piston 440 is propelled down the passage 402 and in so doing pushes the chain down the passage. The chain is guided primarily by the guide walls 414. As each link 434*a*–434*n* moves past a driven gear 402, the teeth 404 are engaged by a corresponding one of the plurality of bars 436. As the driven gear 402 is driven by the driving device 430, i.e. the chain 432, the spool 24 is reverse rotated so as to retract a determinable amount of webbing back onto the spool to draw the seat belt 31 tightly about the occupant. As shown, under the operation of the pretensioner 400 and with a full stroke of the chain, the spool 24 will reverse rotate about 2.5 revolutions.

As the chain 432 advances through the passage 400 its end 435 is pushed through the open end 410. As can be appreciated, the shape of the tube 408 has not been discussed in any detail. As can be seen from FIG. 2 the tube is planar and arcuately shaped such that the ends 410 and 416 are proximate to one another providing a compact configuration. The tube can be oval, square or rectangular with rounded corners, circular, straight, etc. In the vicinity of the gear 402 the tube is bent slightly such as by about nineteen (19) degrees to insure that at least two (2) gear teeth 404 are in engagement with two cross-bars 436 at any given time.

Figure 3:
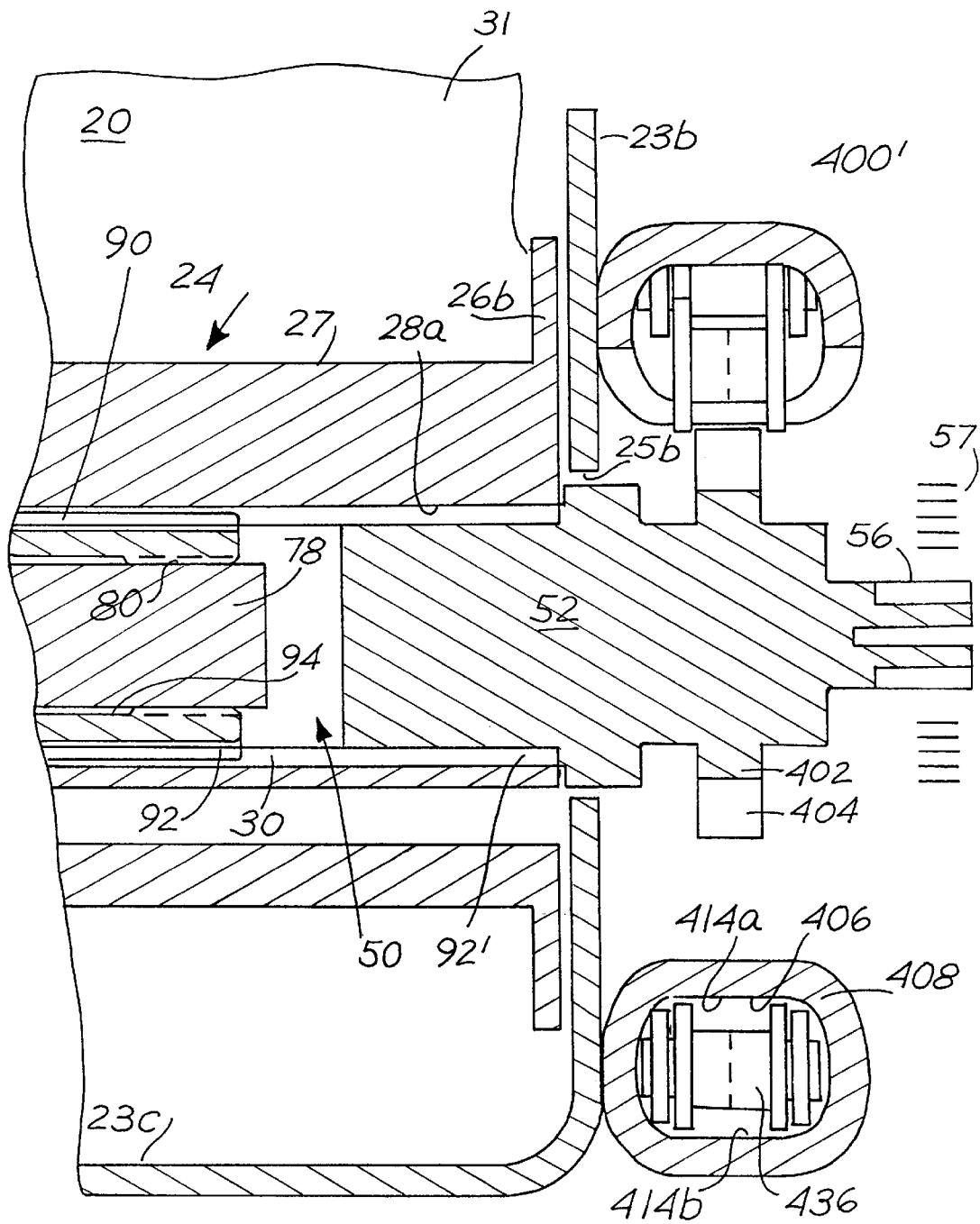
FIG. 3 shows an alternate embodiment of the invention.

As mentioned above, the pretensioner 400 can work with all retractors and can be configured to direct drive the spool as shown in FIG. 3 below, that is, by having the driven gear 402 in direct driving communication with the spool, or alternatively indirectly drive the spool as indicated in FIG. 1. As previously mentioned, FIG. 1 shows the combination of the pretensioner 400 with an energy absorbing retractor 20; the following defines the overall operation of this combination.

During an accident the lock wheel is stopped by the action of the various sensors and the pretensioner 400 is activated to reverse wind the spool. The rotation of the first member 52 is transferred to the second member 70 through the interface of the bore 54 and end 55. The rotation of the second member 70 is transferred to the spool 24 through the threaded and splined interconnection of the second member/nut/spool to eliminate slack in the seat belt (shoulder and/or lap belt). As can be appreciated, with the pawl 77 engaging the teeth 73 of the lock wheel 71 the second member 70 cannot rotate in a belt unwinding direction. Subsequently, the occupant will tend to move forward as the accident progresses and load the seat belt 31. The occupant's motion (position and acceleration) is then controlled by the reaction force generated within the retractor. The occupant's load on the shoulder belt is partially transmitted via the remaining seat belt webbing wound about the center part 27 of the spool 24 creating a torque tending to rotate the spool, in a belt unwinding direction. The spool rotates about the bearing surfaces provided by the first member 52 and the member 79. The tendency of the spool to rotate is curtailed by the reaction forces generated at the interfaces between the nut 90 and the spool 24, the nut and the second member and the lock wheel 71 and the lock pawl 77. The loads (or torques) imparted to the spool are transmitted directly to the threads 80 of the now locked second member 70 which tend to cause the nut 90 to try to rotate to the left about the threads 80 as viewed in FIG. 1 and simultaneously slide along the splines 30. This motion is initially halted by the bushing 100 which is loaded between the stop member 79 and washer 102. At some level of belt force the torsional forces developed at the thread 80/94 interface will be sufficient to cause the bushing 100 to begin to deform. Once this force level is reached the nut 90 will continue to rotate and slide along compressing or deforming the bushing. As can be appreciated as the spool rotates, seat belt webbing is permitted to protract in response to the pulling force exerted by the occupant on the seat belt. The pulling force is limited principally by the reaction force capability of the shaft assembly 50, that is, the compression characteristics of the bushing 100. In this manner the HIC and chest loading of the occupant are limited. As can be seen from the above and in the preferred embodiment of the invention, control of the occupant's motion is obtained by generating a substantially constant reaction force against the belt. This constant reaction force permits the occupant to be subjected to a controlled, generally constant acceleration. Subsequent to the accident, the retractor is fully functional, that is the spool can rotate and the seat belt will protract under force and retract under control of the return spring.

Reference is briefly made to FIG. 3 which illustrates a partial section view of an alternate embodiment of the invention. In this embodiment the first member 52 and second member 70 of the axle assembly 50 are no longer connected. Additionally, the first member 52 is drivingly directly connected to the spool 24 via splines 92' or the like. During operation of this pretensioner 400', as with pretensioner 400, the gear 402 drives the second member 52 to directly drive the spool to retract or wind webbing thereon. Subsequently, and in response to occupant loading of the seat belt (shoulder belt) the spool will rotate oppositely, in the direction of webbing protraction, as mentioned above. The second member 52 will rotate with the spool 24 as they are directly connected. It should be appreciated that even if the chain remained in contact with the gear 402 the rotation of the spool is not impeded. The chain 432 chain will be moved back and forth into the tube 408 as the gear 402 rotates (with the spool).

In an alternate embodiment of the pretensioner the pyrotechnic charge is sufficient to propel the entire chain 432 including the piston 422 out of the tube 406 such that after the spool has been reverse wound the pretensioner, i.e. the chain 432 will not obstruct the rotation of the spool 24.

Many changes and modifications in the above described embodiment of the invention can, of course, be carried out without departing from the scope thereof. Accordingly, that scope is intended to be limited only by the scope of the appended claims.

It is claimed:

1. An apparatus (20, 400) comprising:

first driven means (402) including a driven toothed gear operatively linked to a spool of a retractor (20) to rotate the spool (24) in a direction of retraction to cause a seat belt (31) wound thereabout to retract;

a drive housing (408) for defining an arcuate drive passage (406) having a first end in close proximity to one side of the gear and a second end in close proximity to an opposite side of the gear;

flexible first drive means (430, 432), slidingly positioned within the drive passage, including a length of chain having a first chain link (435) initially maintained out of engagement with the gear and pushed into engagement with the gear upon activation of a pyrotechnic gas source, the chain including a plurality of chain links within the drive passage, the chain extending rearwardly and prior to activation of the gas source the chain extends rearwardly generally to the location of the gas source;

the pyrotechnic gas source, positioned within the second end of the drive passage and operatively linked to a rear end of the chain for pushing the chain through the drive passage into engagement with the gear thereby causing the gear to rotate.

2. The apparatus as defined in claim 1 wherein the drive passage circumscribes the first drive means.

3. The apparatus as defined in claim 1 wherein the drive passage includes at least two opposing generally flat sides (414).

4. The apparatus as defined in claim 1 further including a retractor frame (22) for rotationally supporting the spool (24) and a return spring (57) for retracting the seat belt;

at least one sensor (300, 302) for initiating the locking-up of the spool.

5. The apparatus as defined in claim 1 wherein the drive housing is one of circular, oval, oblong, generally square, generally rectangular and straight.

6. The apparatus as defined in claim 1 wherein a piston (440) is operatively linked to the rear end (437) of the first drive means, and a seal (442) is provided to prevent the products of combustion from flowing beyond the piston into the drive passage.

7. The apparatus as defined in claim 1 wherein the first driven means is connected to the spool through an axle part that is directly connected connected to the spool.

8. The apparatus as defined in claim 1 wherein the first driven means is connected to the spool through an axle part that is indirectly connected to the spool.

9. An apparatus comprising:

a seat belt retractor including a frame and a spool rotatably supported upon the frame;

a drive housing mounted adjacent the retractor frame including an arcuate drive passage;

a gear operatively linked to the retractor to rotate the spool in a direction of retraction to cause a seat belt wound thereabout to retract; the gear includes a plurality of gear teeth and a portion of the gear intersects the drive passage;

a flexible chain, located within the drive housing, including a plurality of interconnected chain links having an engagement member or cross-bar for driving the gear, a first chain link initially maintained spaced apart from the gear wheel, the first link including a first engagement member having a truncated surface to avoid binding with a tooth of the gear if any such gear tooth were in a condition that would otherwise cause such binding and to insure that each subsequent engagement member synchronously engages other teeth of the gear to avoid a condition in which the binding of an engagement member and tooth would occur;

a pyrotechnic actuator which generates products of combustion to propel the chain down a drive passage and operatively linked to a rear end of the chain for pushing the chain into engagement with the gear thereby causing the gear to rotate.

10. The apparatus as defined in claim 9 wherein the first engagement member is a cylindrical cross-bar having its lower half removed.

11. The apparatus as defined in claim 9 wherein the drive housing includes a generally straight first section proximate the intersection of the gear and a curved second section immediately adjacent to the first section, the first section angled toward the gear to ensure that at least two engagement members are in engagement with corresponding teeth of the gear.

12. An apparatus comprising:

a seat belt retractor including a frame and a spool rotatably support upon the frame;

a gear having a plurality of teeth operatively linked to the retractor to rotate the spool in a direction of retraction to cause a seat belt wound thereabout to retract;

a drive housing mounted adjacent the retractor frame including an arcuate drive passage, the drive passage including a first end and a second end, both the first and second ends generally located within the profile of the frame of the retractor to yield a compact design thereof;

a flexible chain located within the drive housing, including a plurality of interconnected chain links (434) for driving the gear wheel;

a pyrotechnic actuator, located within the second end of the drive passage, the pyrotechnic actuator generating products of combustion to propel the chain down the drive passage into engagement with the gear thereby causing the gear to rotate.

\* \* \* \* \*